(12) United States Patent
Kato et al.

(10) Patent No.: US 7,680,486 B2
(45) Date of Patent: Mar. 16, 2010

(54) SENSOR NETWORK SYSTEM

(75) Inventors: Hiromitsu Kato, Kawasaki (JP); Takeshi Miyao, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 880 days.

(21) Appl. No.: 10/559,659

(22) PCT Filed: Feb. 27, 2004

(86) PCT No.: PCT/JP2004/002413

§ 371 (c)(1), (2), (4) Date: Apr. 5, 2006

(87) PCT Pub. No.: WO2005/015525

PCT Pub. Date: Feb. 17, 2005

(65) Prior Publication Data

US 2006/0258292 A1    Nov. 16, 2006

(30) Foreign Application Priority Data

Aug. 11, 2003   (JP) ............................. 2003-207012

(51) Int. Cl.
*H04L 12/58* (2006.01)
(52) U.S. Cl. ............... 455/412.1; 455/456.1; 455/435.1
(58) Field of Classification Search .............. 455/456.1, 455/412.1, 435.1, 554.2; 370/310, 346
See application file for complete search history.

(56) References Cited

U.S. PATENT DOCUMENTS 6,710,326 B2 * 3/2004 Okamoto .................... 250/221

(Continued)

FOREIGN PATENT DOCUMENTS

JP    11-259569    9/1999

(Continued)

OTHER PUBLICATIONS

Hideki Enomoto, "Hisesshoku IC Card to GIS o Mochiita Kukan Joho System", Dai 23 Kai Proceedings of the Symposium on Engineering Information Processing System, Oct. 27, 1998, ISSN 0915-5333, pp. 31 to 34.

(Continued)

*Primary Examiner*—Joseph H Feild
*Assistant Examiner*—Huy D Nguyen
(74) *Attorney, Agent, or Firm*—Antonelli, Terry, Stout & Kraus, LLP.

(57) ABSTRACT

An object of the invention is to save the trouble of mapping sensor chips on a map information system. A map information management unit 124 is accessed via a network 122. Neighborhood information based on a present position measured by an own position measuring unit 102 is obtained by searching a map DB 127. A sensor information setting unit 106 displays the neighborhood information in a display unit 108. An ID reading unit 104 reads an ID 111 of a sensor chip 110, and registers the ID 111 in the map DB 127 after associating it with equipment information displayed in the display unit 108. The measurement values measured by a sensor 112 are transmitted from an antenna 114 and received by a sensor information receiving unit 119 of the receiver 118. A sensor information communication unit 120 accesses the network 122 and the measurements are transmitted to a sensor information management unit 123. The measurement values are accumulated in a sensor DB 126. The sensor DB 126 is searched using a sensor ID associated in the map DB 127 and the measurements are viewed as map information associated with equipment.

9 Claims, 17 Drawing Sheets

U.S. PATENT DOCUMENTS

| | | | |
|---|---|---|---|
| 6,798,184 B2* | 9/2004 | Honda | 324/71.5 |
| 7,336,202 B2* | 2/2008 | Kawai et al. | 340/870.17 |
| 2003/0058095 A1* | 3/2003 | Satoh | 340/509 |
| 2003/0102872 A1* | 6/2003 | Honda | 324/438 |
| 2003/0214399 A1* | 11/2003 | Naruse et al. | 340/531 |
| 2003/0216880 A1* | 11/2003 | Endoh | 702/122 |
| 2003/0229514 A2* | 12/2003 | Brown | 705/2 |
| 2007/0250410 A1* | 10/2007 | Brignone et al. | 705/28 |

FOREIGN PATENT DOCUMENTS

| | | |
|---|---|---|
| JP | 2000-39342 | 2/2000 |

OTHER PUBLICATIONS

Tatsunori Sada, "Kensetsu Bun'ya ni Okeru Kukan Joho Riyo no Torikumi", JACIC Joho, vol. 14, No. 2, Jul. 30, 1999, ISSN 0914-4528, pp. 57 to 60.

* cited by examiner

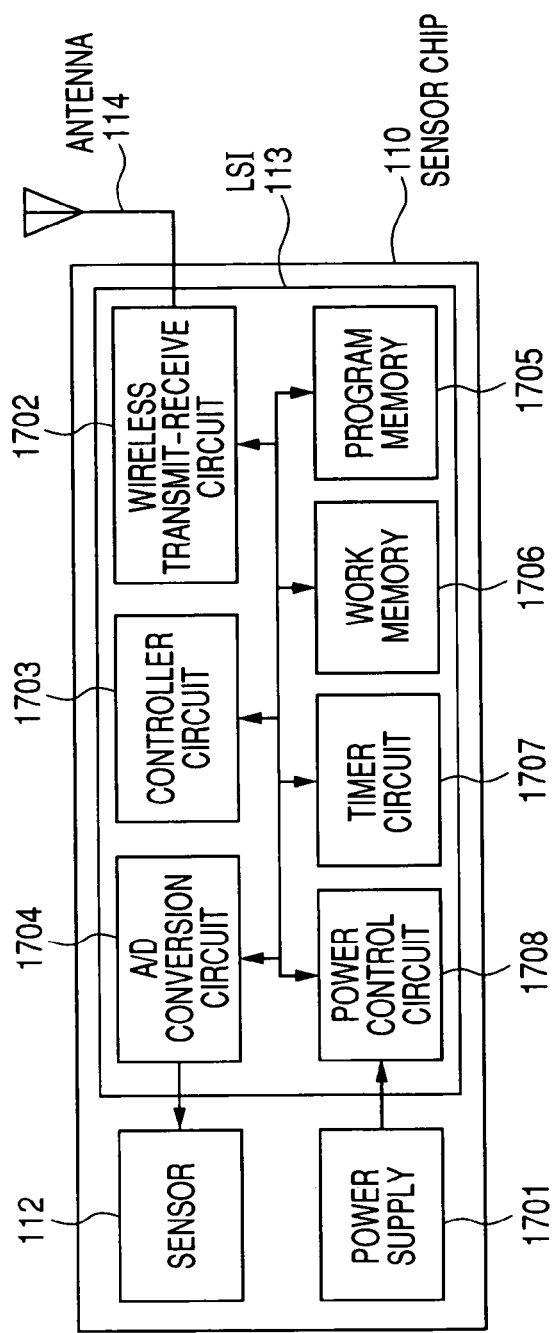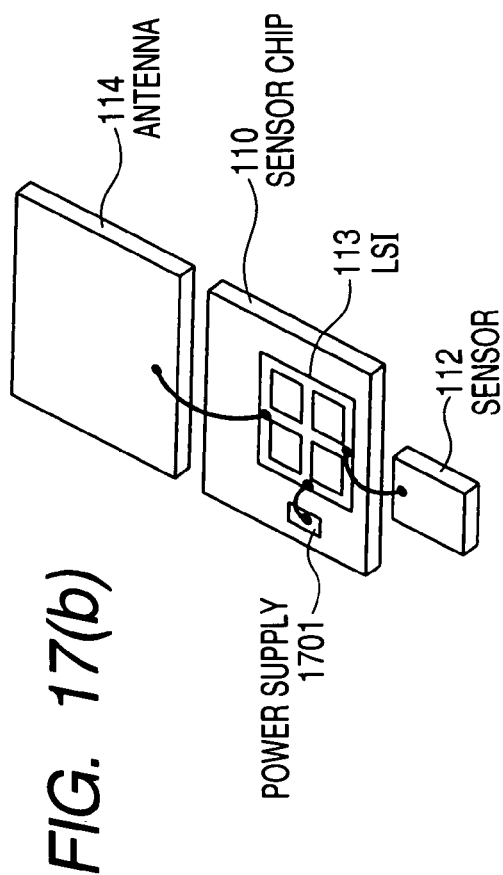
FIG. 17(a)
FIG. 17(b)

SENSOR NETWORK SYSTEM

TECHNICAL FIELD

The present invention relates to a system for managing locations where IC chips with a built-in sensor are installed. More particularly, it relates to a sensor location management system suitable for an application in which IC chips are installed over a wide area and measurements obtained using built-in sensors are collected from the whole area.

BACKGROUND ART

Technology called MEMS (Micro Electro Mechanical System), which realizes functions of an electronic device on a micro IC chip, has been progressing remarkably in recent years. MEMS makes it possible to realize sensor chips having measurement and wireless communication functions. Measurements produced by such sensor chips can be collected by wireless communication. Such sensor chips can, therefore, be installed arbitrarily in diversified locations. They are expected to find applications where equipment management or environmental management is required to be more meticulous than before.

When using such small wireless sensors, it becomes necessary to have a means for knowing where they are installed. To grasp where sensor chips are installed, it used to be necessary to note down locations where sensors are installed on a drawing on paper while identifying types of sensor chips installed by sensor installation personnel and subsequently register information grasped in such a way in a geographical information system (GIS). Even under such a circumstance, sensor installation personnel may be able to access the GIS via a network, but it is still necessary to associate, at where the sensor chips are installed, sensor information with location information. Such work is quite troublesome when the number of sensor chips involved is very large.

To simplify the work, a positioning function such as GPS may be incorporated in each sensor chip, so that the location of the sensor chip can be automatically registered when it is installed. Incorporating a positioning function in a sensor chip, however, makes the sensor chip larger in size and more complicated in configuration. A technique for grasping locations of objects without a positioning function is disclosed, for example, in Japanese Patent Laid-Open No. H11(1999)-259569. When the technique is applied to a merchandise information management system having a map interface, location information associated with merchandise information transmitted from a mobile terminal can be easily registered in a merchandise information providing server.

DISCLOSURE OF INVENTION

There are the following problems with the conventional technique.

When the position of a sensor chip is measured using a mobile terminal having a positioning function as described in the patent document 1, it is possible that a position considerably apart from where a sensor chip is installed is managed as a sensor chip position in a case where the available positioning accuracy is not high enough. Correcting such an error is troublesome.

The present invention provides, without requiring the mechanism of sensor chips to be changed, a means for saving the trouble of mapping sensor information on a map information system.

The present invention provides a sensor network system including a sensor chip which can transmit measurement values by wireless communication, a sensor database which stores the measurement values measured by the sensor chip, a sensor information management unit which manages access to the sensor database, a receiver which receives the measurement values from the sensor chip and accesses the sensor information management unit via a network, a map database which stores, as map information, data about equipment in which the sensor chip is installed, a map information management unit which manages access to the map data base, and a sensor management device which registers a location where the sensor chip is installed in the map database.

The sensor control device according to the present invention is provided an ID reading unit which reads identification information assigned to the sensor chip, an own position measuring unit which acquires a present position, a wireless communication unit which can connect to the network by wireless communication, a sensor information setting unit which inputs and outputs information about the sensor chip, a display unit and an input unit both of which are controlled by the sensor information setting unit, a memory which stores a program and data, and a CPU which executes the program.

The sensor chip according to the present invention has a stake-shaped container which can be put in the ground as an exterior package.

The display unit according to the present invention displays a sensor information acquisition button, a sensor information display unit, a neighborhood information display unit which displays data about the equipment as neighborhood map information, a cross-shaped reference icon which appears in the neighborhood information display unit and which indicates a present position, and an enter button which is used to register the sensor information and the equipment data in a state of being associated with each other.

The sensor management device according to the present invention detects pressing of the sensor information acquisition button, makes the ID reading unit acquire the identification information having been encoded, decodes the sensor information based on the identification information acquired, and displays the sensor information in the sensor information display unit.

The sensor control device according to the present invention detects pressing of the sensor information acquisition button, makes the ID reading unit acquire the identification information, makes the wireless communication unit access the sensor information management unit, transmits the identification information, makes the sensor information management unit acquire a sensor ID from the identification information, makes the sensor information management unit search the sensor database using the sensor ID as a key and acquire corresponding sensor information, transmits the sensor information to the sensor information setting unit, and displays the sensor information in the sensor information display unit.

The sensor control device according to the present invention displays, when pressing of the enter button is detected with the neighborhood information display unit being selected and with an equipment icon displayed in the neighborhood information display unit being selected, a sensor icon at a position where the equipment icon is displayed, accesses the map information management unit upon confirming a combination of the equipment icon and the sensor icon, and associates the sensor ID with data being associated with the equipment icon, the data being included in the map database.

The display unit according to the present invention displays the equipment icon, when it is selected, differently from other equipment icons.

The sensor control device according to the present invention displays, when pressing of the enter button is detected with the neighborhood information display unit being selected, the sensor icon at a position of the reference icon, accesses the map information management unit upon confirming a position of the sensor icon, and associates the position with data associated with the sensor icon, the data being included in the map database.

The map information management unit according to the present invention detects selection of the equipment data, acquires the associated sensor ID from the map database, and acquires the measurement values associated with the sensor ID, the measurement values being accumulated in the sensor database.

BRIEF DESCRIPTION OF DRAWINGS

FIG. 17 shows an example block configuration and an example external view of a sensor chip.

BEST MODE FOR CARRYING OUT THE INVENTION

An embodiment in which the present invention is applied to a microtremor measurement system will be described in the following with reference to the accompanying drawings. By measuring microtremor on the ground surface using an acceleration sensor or a speed sensor, the amplification characteristic of earthquake motion at the location of the measurement can be evaluated. An amplification characteristic of earthquake motion is an important parameter for evaluating local geological vulnerability. The present embodiment makes it possible to evaluate geological vulnerability not only at a representative point of a region but at locations all over the region.

Figure 1:
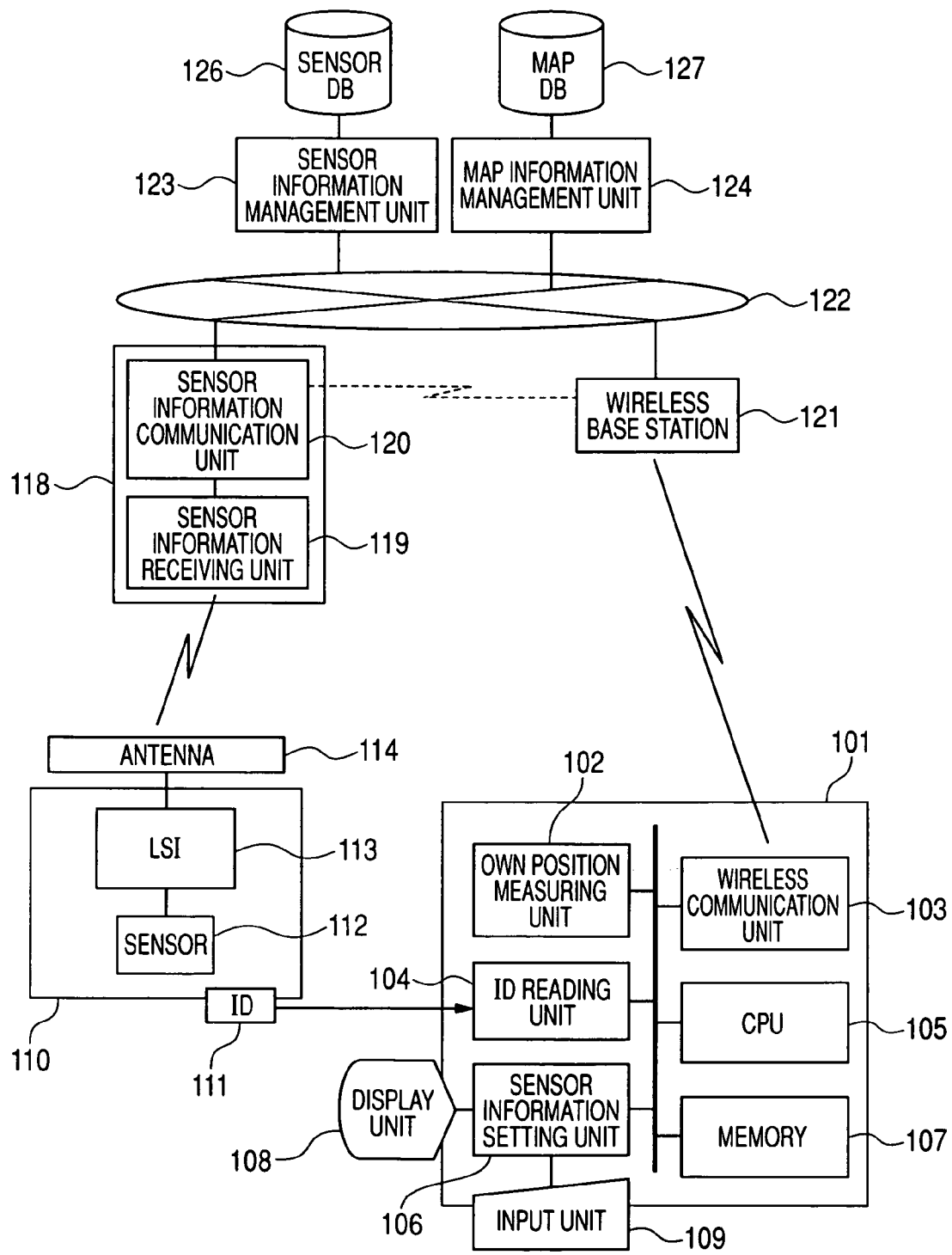
FIG. 1 is a diagram showing an overall configuration of a microtremor measurement system according to an embodiment of the present invention.
Figure 2:
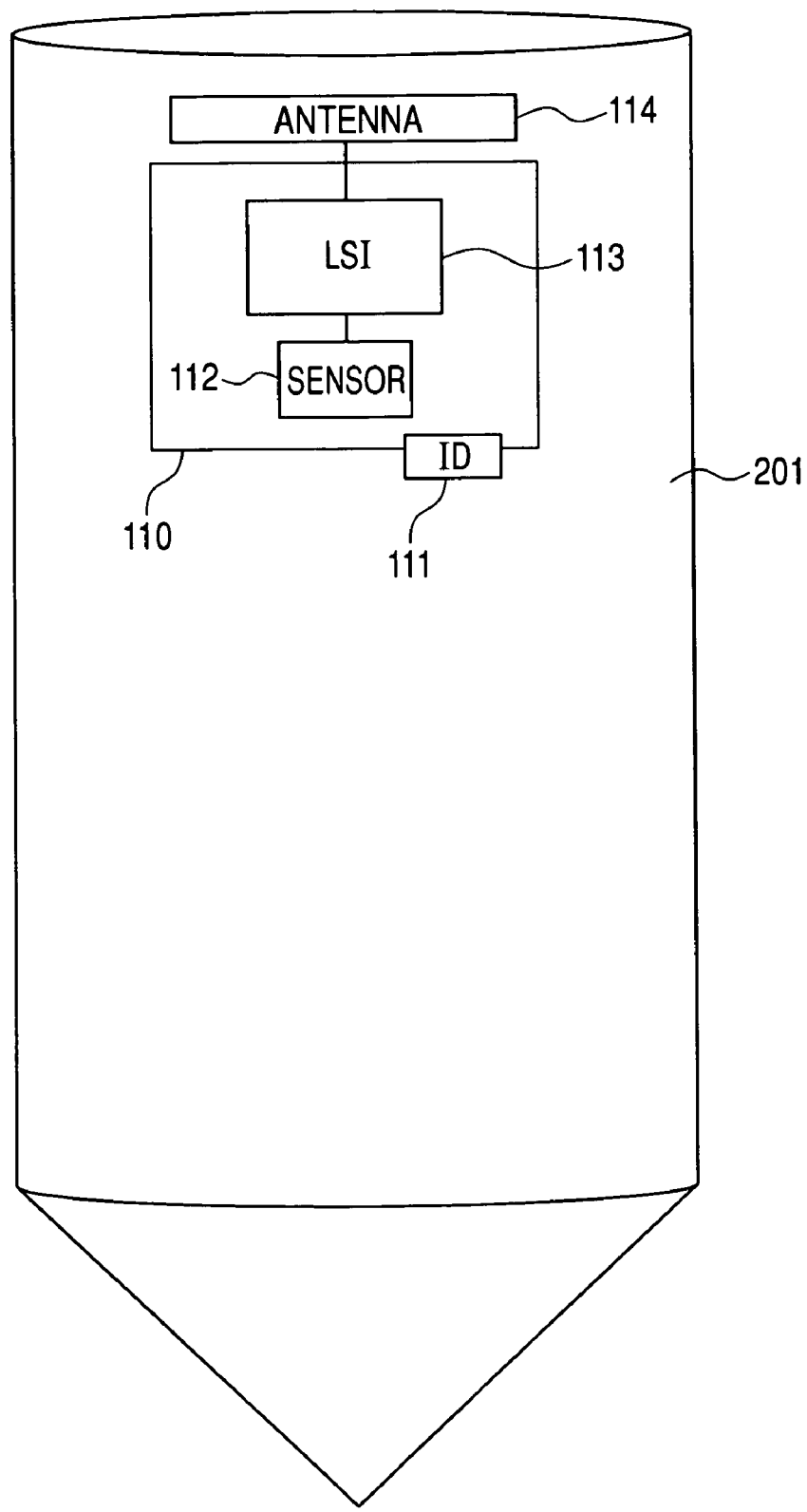
FIG. 2 is a diagram showing an overall view of an example of a sensor chip put in a stake-shaped container.

FIG. 1 shows an overall configuration of the system. A value measured by a sensor 112 included in a sensor chip 110 is received by a receiver 118 via wireless communication. The measured value is communicated to a sensor information management unit 123 and stored in a sensor DB 126. An ID 111 is attached to the sensor chip 110. The ID 111 may be, for example, a bar code, a two-dimensional code, or a small RFID tag. In the present embodiment being described below, the ID 111 is a two-dimensional code.

In the sensor chip 110, the value measured by the sensor 112 is processed in an LSI (Large Scale Integrated Circuit) 113 and then transmitted to the receiver 118 via an antenna 114. Although the sensor chip 110 is supposed to be attached to equipment using a sticker, it may be built into a stake 201 beforehand and the stake 201 may be put into the ground to make measurement. In the receiver 118, a sensor information receiving unit 119 receives the measured value transmitted from the antenna 114, and a sensor information communication unit 120 connects the measured value to a network 122. The sensor information communication unit 120 may be provided with a wireless communication function so that it may connect to the network 122 via a wireless base station 121. The receiver 118 may be attached to a utility pole for a wired connection to the network 122. Or, it may be mounted on a vehicle so that a user may collect microtremor measurements cruising through locations and make wireless connection to the network 122.

FIG. 17 shows a block configuration and an external view of the sensor chip 110 according to the present embodiment. The sensor chip 110 comprises, as shown in FIG. 17(a), the LSI 113 that realizes central functions of the sensor chip 110, the antenna 114 used to transmit and receive data to and from the receiver 118 (see FIG. 1), the sensor 112 for inputting data from outside, and a power supply 1701 inclusive of a power generating device (for example, a solar photovoltaic device, an oscillating power generation device, or a microwave power generating device). The LSI 113 includes a wireless transmit-receive circuit 1702 which, being connected to the antenna 114, transmits and receives data to and from the receiver 118, a controller circuit 1703 which is a CPU (Central Processing Unit) to perform overall control of the LSI 113, an A/D (Analog/Digital) conversion circuit 1704 which converts analog data inputted from the sensor 112 into digital data, a program memory 1705 which is a ROM (Read Only Memory) storing programs, a work memory 1706 which is a work RAM (Random Access Memory) used in program execution, a timer circuit 1707 which generates signals at constant intervals (clock signals), and a power control circuit 1708 which maintains the power supplied from the power supply 1701 at a constant voltage and which saves power consumption by cutting off the power supply when no power supply is required. The LSI 113 need not necessarily be composed of one chip. It may be a board on which plural chips are mounted or an MCP (Multi Chip Package). As shown in FIG. 17(b), the sensor chip 110 is, as viewed externally, divided into the antenna 114, a body of the sensor chip 110, and the sensor 112. The LSI 113 and the power supply 1701 are mounted on the body of the sensor chip 110.

In a sensor management device 101, a CPU 105 executes programs stored in a memory 107, thereby controlling operations of an own position measuring unit 102, a wireless communication unit 103, an ID reading unit 104, and a sensor information setting unit 106.

The programs may be stored in the memory 107 in advance. They may also be introduced from a storage medium that can be out on and taken off and that the sensor management device 101 can use or from an external device via a network or via a communication medium using a carrier wave propagating through a network.

The own position measuring unit 102 measures the present position of the sensor management device 101. For this, the techniques already known include, for example, GPS (Global Positioning System) for outdoor applications and positioning systems using infrared rays or ultrasonic waves for indoor applications. The wireless communication unit 103 is connected to the network 122 via the wireless base station 121. It may be, for example, a mobile telephone, a PHS, or a wireless LAN. When connected to the network 122, it can access the sensor information management unit 123 that manages the sensor DB 126 storing sensor information or a map information management unit 124 that manages a map DB 127 storing equipment information as map information.

The ID reading unit 104 is a mechanism for reading the ID 111. In a case in which the ID 111 is a two-dimensional code, the ID reading unit 104 may be a camera for reading two-dimensional code. The sensor information setting unit 106 controls information output to a display unit 108 and reception of user input from an input unit 109, thereby providing a user interface needed to associate sensor information with map information.

Figure 3:
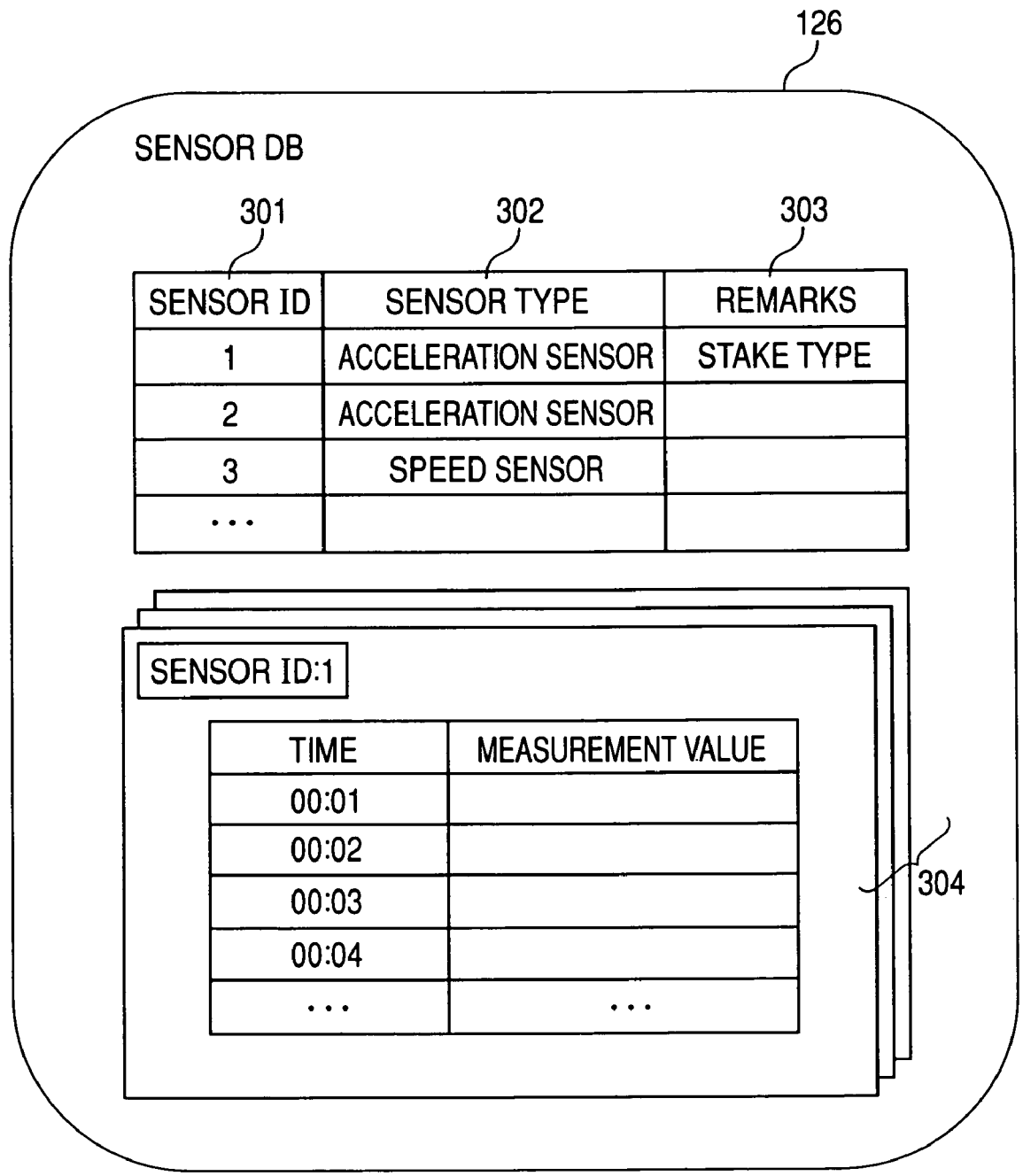
FIG. 3 is a diagram showing an example of an internal data configuration of a sensor DB.
Figure 4:
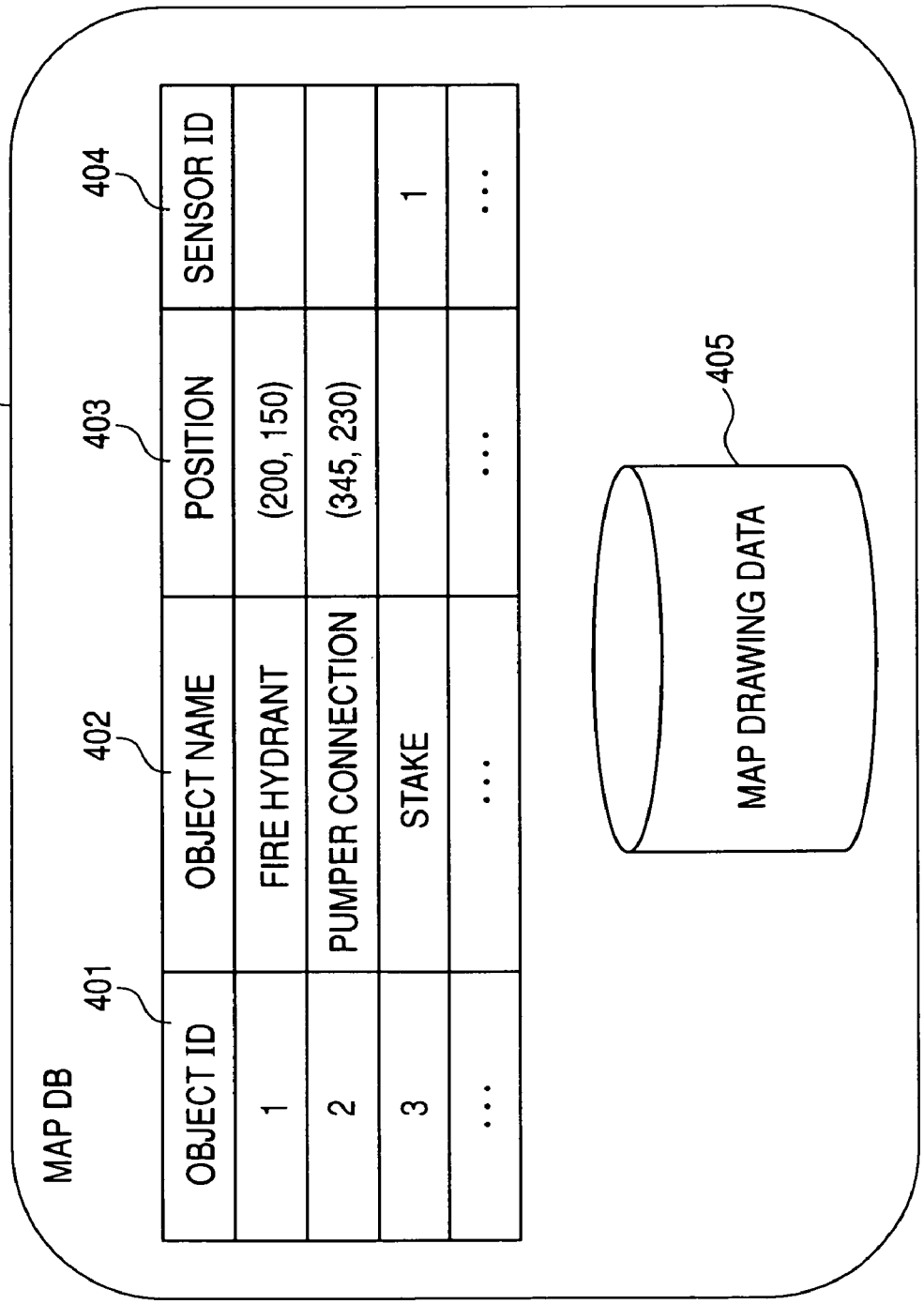
FIG. 4 is a diagram showing an example of an internal data configuration of a map DB.

Configurations of the sensor DB 126 and map DB 127 will be described with reference to FIGS. 3 and 4, respectively. The sensor DB 126 includes a table in which sensor IDs 301, sensor types 302 and remarks on sensors 303 can be recorded. A sensor ID 301 is associated with an ID 111 attached to a sensor chip 110. The above pieces of information are to be registered before the corresponding sensor chip 110 is attached to equipment. Information about the mode of introduction of the sensor chip 110 and on the format of measurements may be stored as the remarks 303. The sensor DB 126 also includes a time-series DB 304 which stores, as time-series data, measurements corresponding to each sensor ID 301. On the other hand, equipment in which a sensor chip 110 is installed is defined as an object in the map DB 127. In an object management table, object IDs 401, object names 402, positions 403, and sensor IDs 404 of installed sensor chips 110 are managed. The sensor IDs 404 are associated with the sensor IDs 301 stored in the sensor DB 126. Referring to FIG. 4, the fire hydrant and the pumper connection are existing equipment, so that their information are entered in the table beforehand. A column of the sensor ID 404 is left blank because the sensor chip 110 is attached later. In the case of the stake 201, the stake 201 has a built-in sensor chip 110 beforehand, but the location where the stake 201 is to be installed is not determined yet. Hence, the column of the position 403 is left blank, but the sensor ID 404 that is associated with the ID 111 of the sensor chip 110 built into the stake 201 is registered in the table, but. When the information about equipment as described above is used as map information, it is displayed being overlapped with data for depicting roads, houses, etc. stored in a map drawing data 405.

Figure 5:
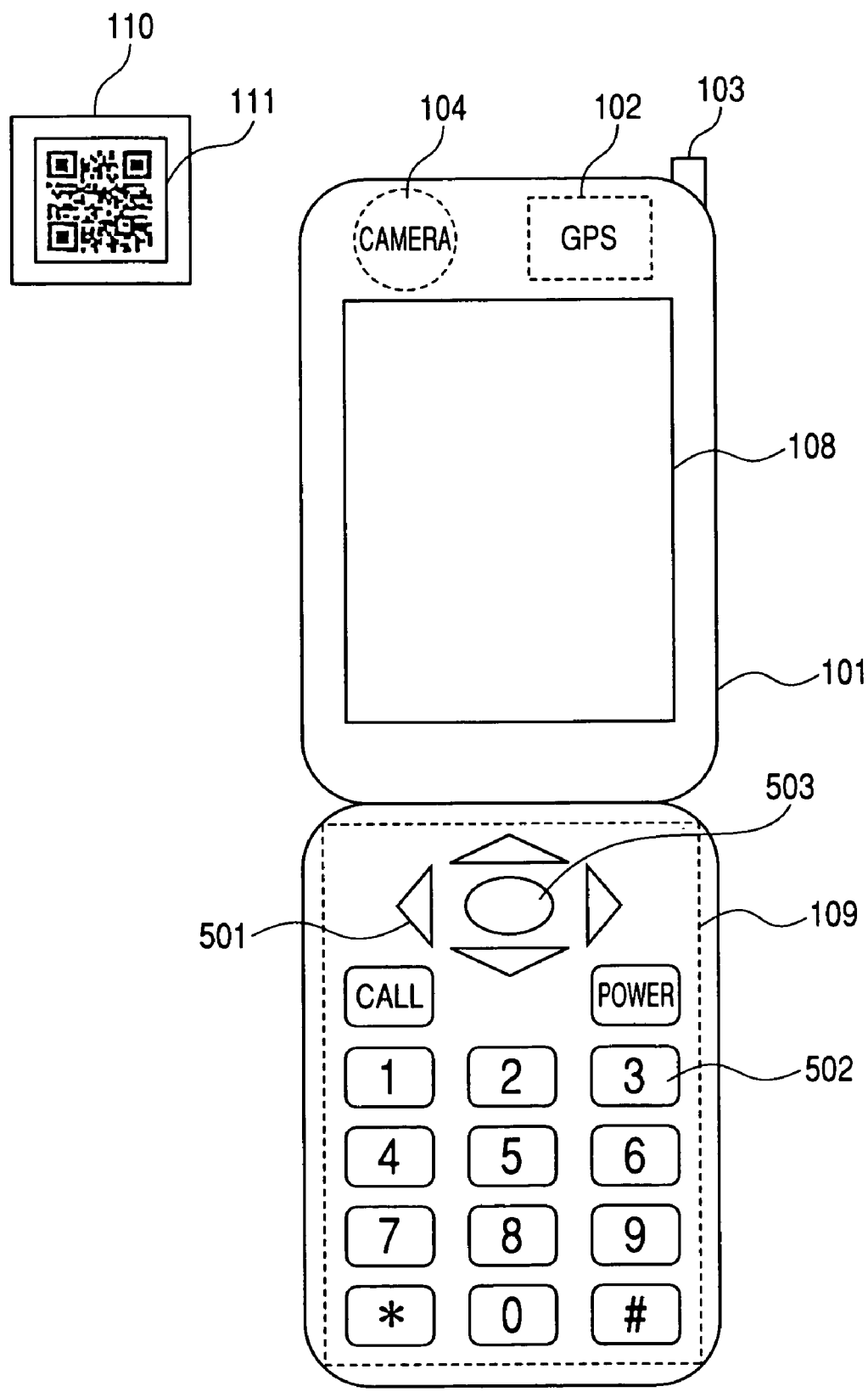
FIG. 5 is a diagram showing an overview of an arrangement in which a two-dimensional code is attached to a sensor chip and in which a mobile telephone provided with a camera and a GPS function is used as a sensor control device.

FIG. 5 shows an aspect in which a mobile telephone provided with a camera and a GPS function is used as the sensor management device 101. The camera used as the ID reading unit 104 is to acquire, by photographing, the two dimensional code ID 111 attached to the sensor chip 110. The GPS is used as the own position measuring unit 102. The wireless communication unit 103 has an antenna. The display unit 108 is made of a display. The input unit 109 includes cursor keys 501, a numeric keypad 502, and a select button 503.

Figure 6:
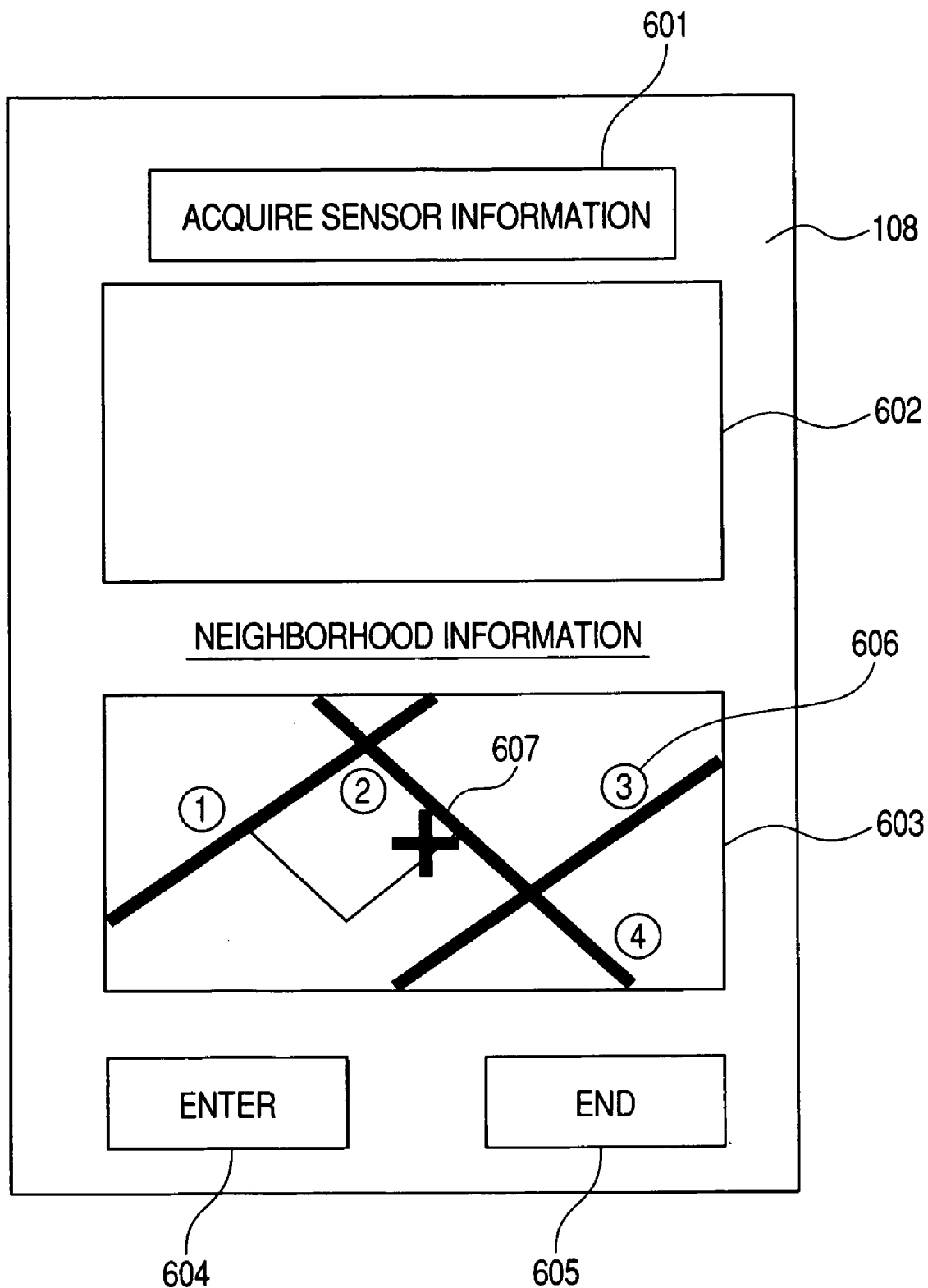
FIG. 6 is a diagram showing an initial screen appearing on the sensor control device.

System operations and a processing flow based on the system configuration described above will be explained in the following. FIG. 6 shows an initial screen which appears on the sensor management device 101. In the display unit 108, an ACQUIRE SENSOR INFORMATION button 601 (a sensor information acquisition button), a sensor information display unit 602, a neighborhood information display unit 603, an ENTER button 604, and an END button 605 are displayed. In the neighborhood information display unit 603, neighborhood information acquired based on the present position is displayed. A reference icon 607 indicating a reference position, that is, the present position determined by measurement, comes at the center of the neighborhood information display. In the screen of the display unit 108, selection regions can be moved up or down using the cursor keys 501. Pressing the select button 503 causes operation corresponding to the present selection to be executed. For example, pressing the select button 503 with the END button 605 being pushed at the present selection on the screen causes the sensor management application to finish.

Figure 7:
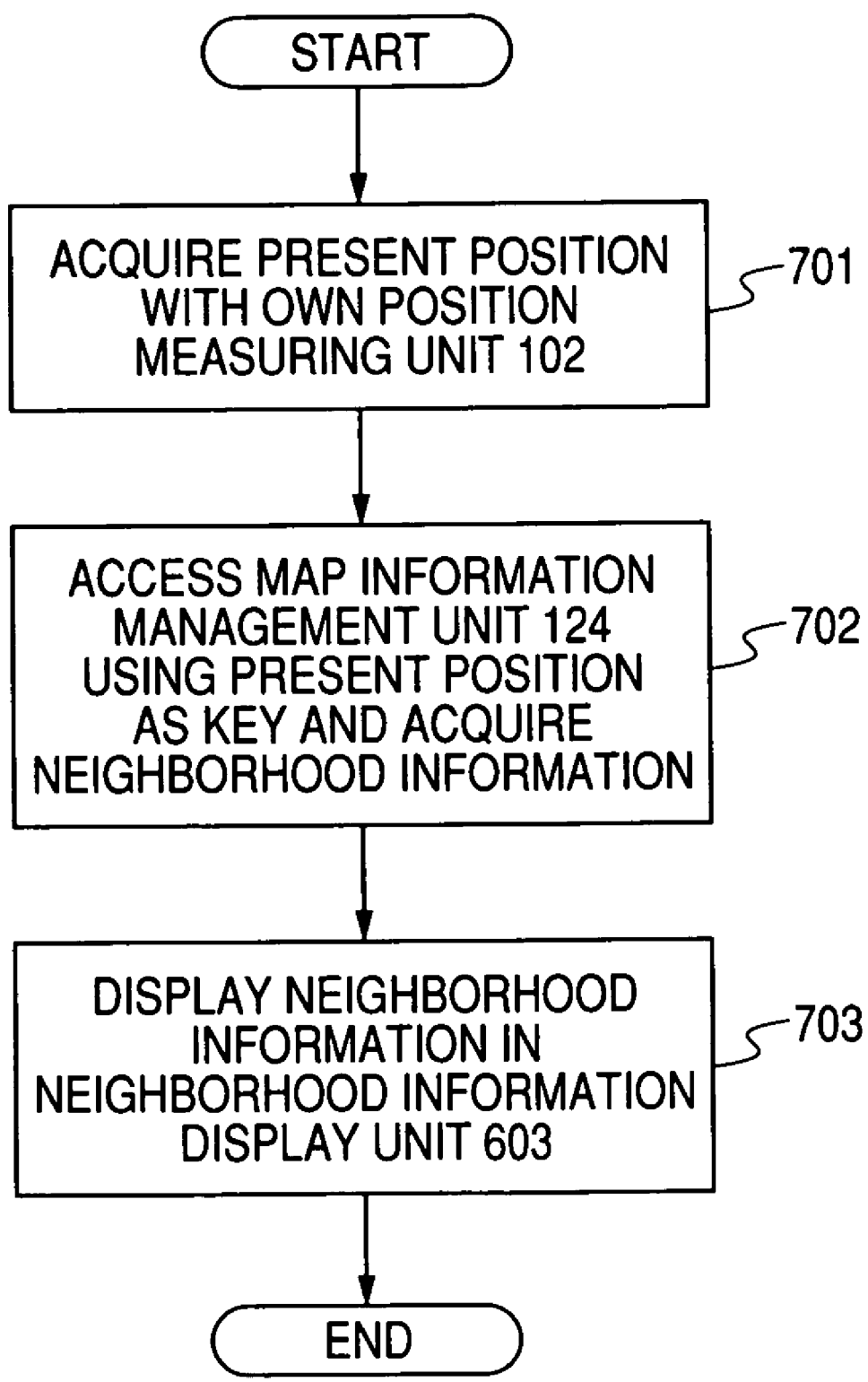
FIG. 7 shows an example of a processing flow for displaying neighborhood information as map information.

FIG. 7 shows a processing flow for displaying neighborhood information. First in the processing flow, the present position is acquired by the own position measuring unit 102 (step 701). The map information management unit is accessed with the present position used as a key, and data about equipment existing within a prescribed distance (for example, 250 m) from the present position are acquired as neighborhood information by searching the map DB (step 702). The acquired neighborhood information is displayed in the neighborhood information display unit 603 using equipment icons 606 (step 703). In the present embodiment, the object ID 401 is described in the equipment icon 606.

Figure 8:
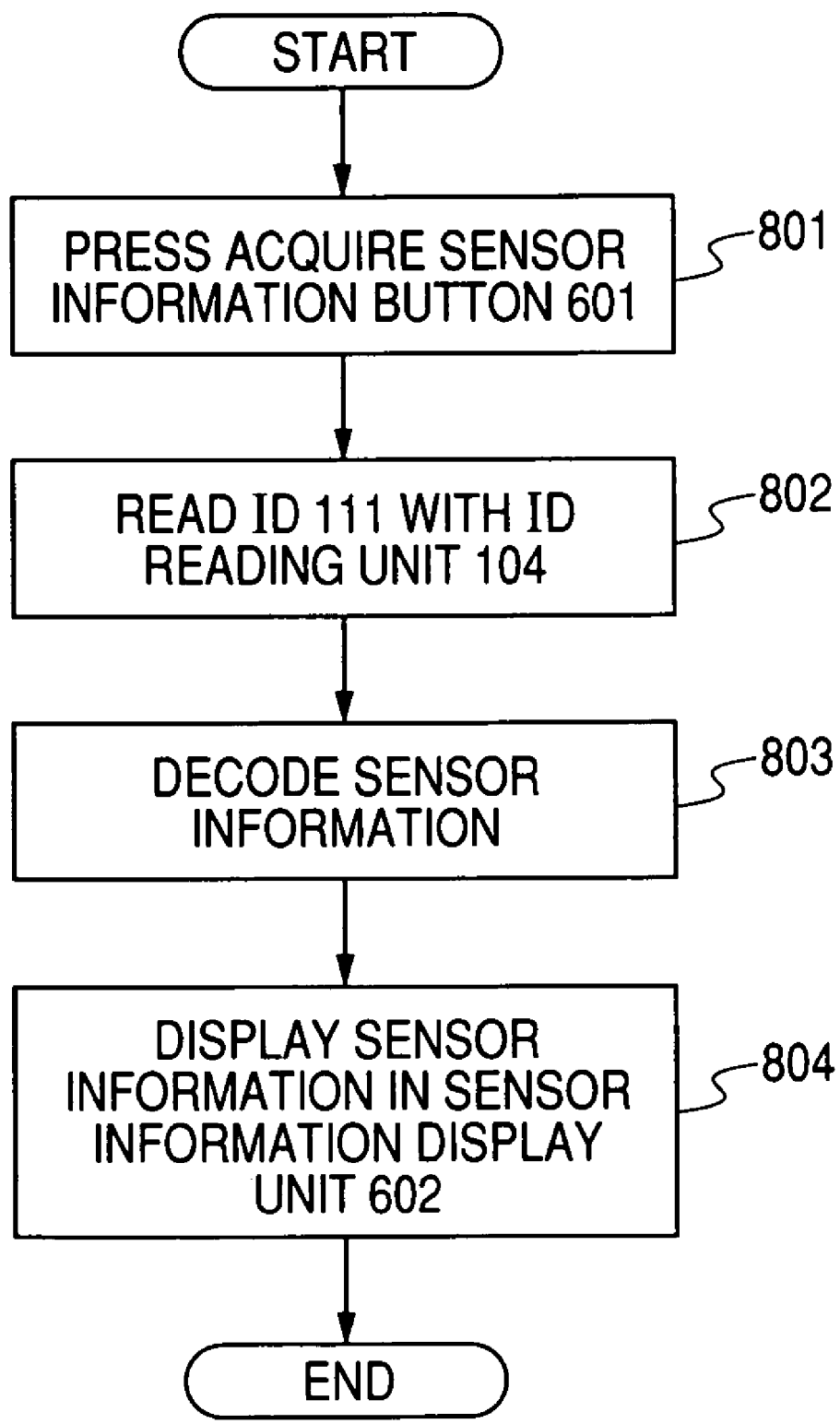
FIG. 8 shows an example of a processing flow for locally acquiring sensor information and displaying the acquired sensor information.

Next, FIG. 8 shows a processing flow for acquiring sensor information. First in the processing flow, pressing of the ACQUIRE SENSOR INFORMATION button 601 is detected (step 801). The ID reading unit 104 reads the ID 111 and acquires an image of the two-dimensional code (step 802). The two-dimensional code is decoded and sensor information is acquired (step 803). The acquired sensor information is displayed in the sensor information display unit 602 of the display unit 108 (step 804).

Figure 9:
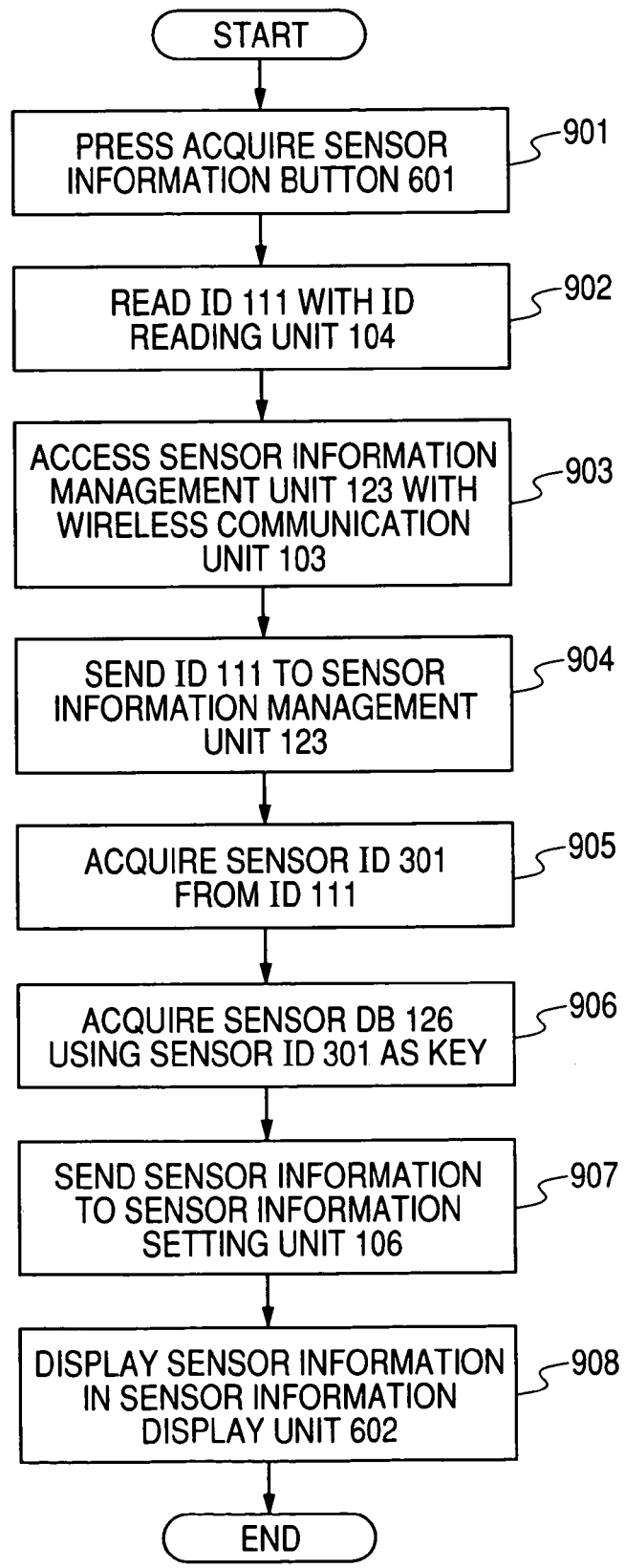
FIG. 9 shows an example of a processing flow for acquiring sensor information by accessing the sensor information management unit and displaying the acquired sensor information.
Figure 10:
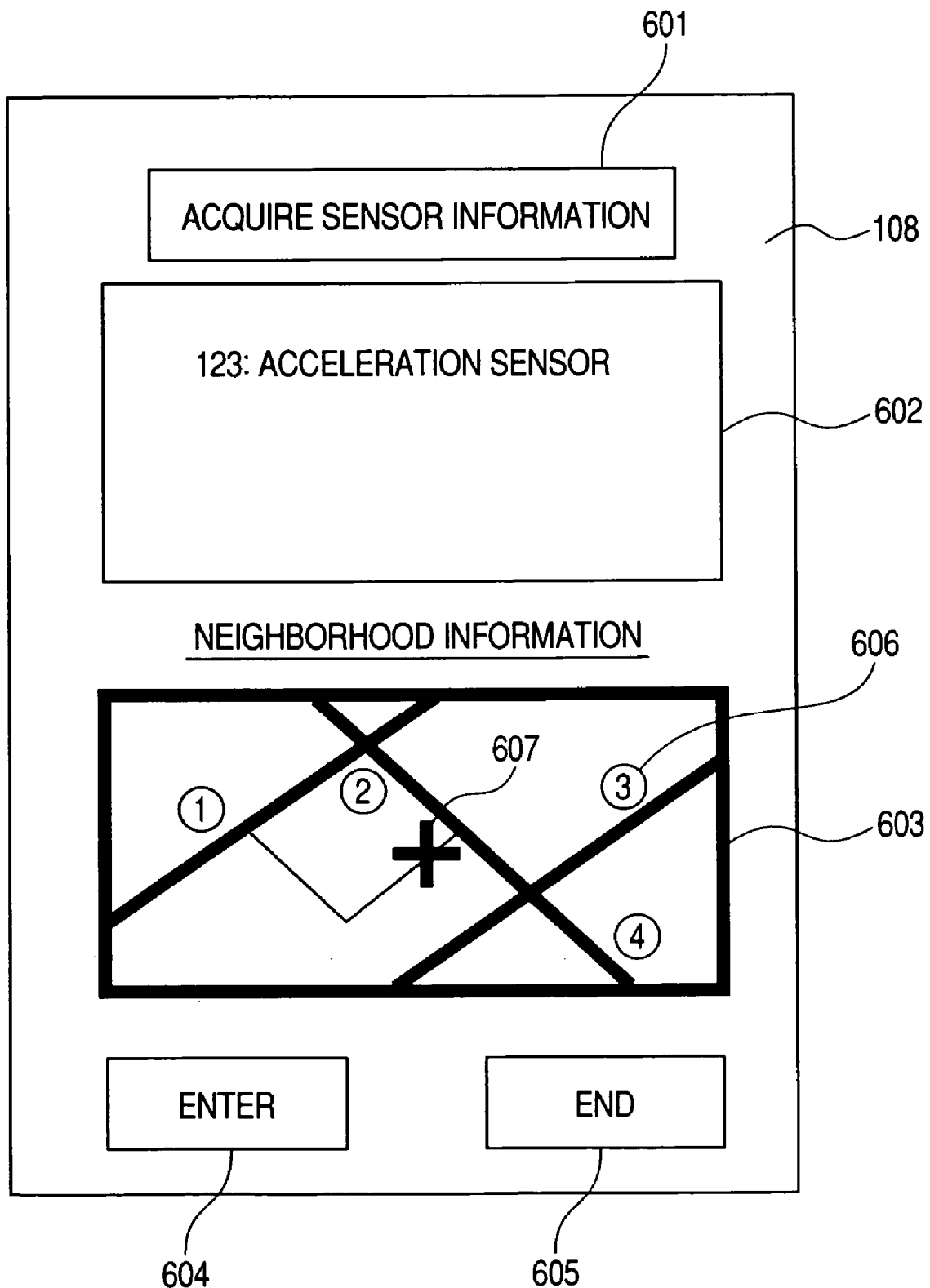
FIG. 10 is a diagram showing that an equipment icon has been selected in the neighborhood information display unit.

When the amount of information obtainable from the ID 111 is not enough, sensor information may be acquired from the sensor DB 126. A processing flow used in such a case is shown in FIG. 9. First in the processing flow, pressing of the ACQUIRE SENSOR INFORMATION button 601 is detected (step 901). The ID reading unit 104 reads the ID 111 and acquires an image of the two-dimensional code (step 902). Next, the wireless communication unit 103 accesses the sensor information management unit 123 (step 903) and the two-dimensional code as the ID 111 to the sensor information management unit 123 (step 904). The sensor information management unit 123 acquires the sensor ID 301 by decoding the received two-dimensional code (step 905). The sensor information management unit 123 searches the DB 126 using the sensor ID 301 as a key and acquires the corresponding sensor information (step 906). The sensor information is then transmitted to the sensor information setting unit 106 (step 907) and displayed in the sensor information display unit 602 of the display unit 108 (step 908). FIG. 10 shows a result of an example display of the sensor information. The sensor information display unit 602 shows that the sensor ID 301 is "123" and "123" is an acceleration sensor.

Figure 11:
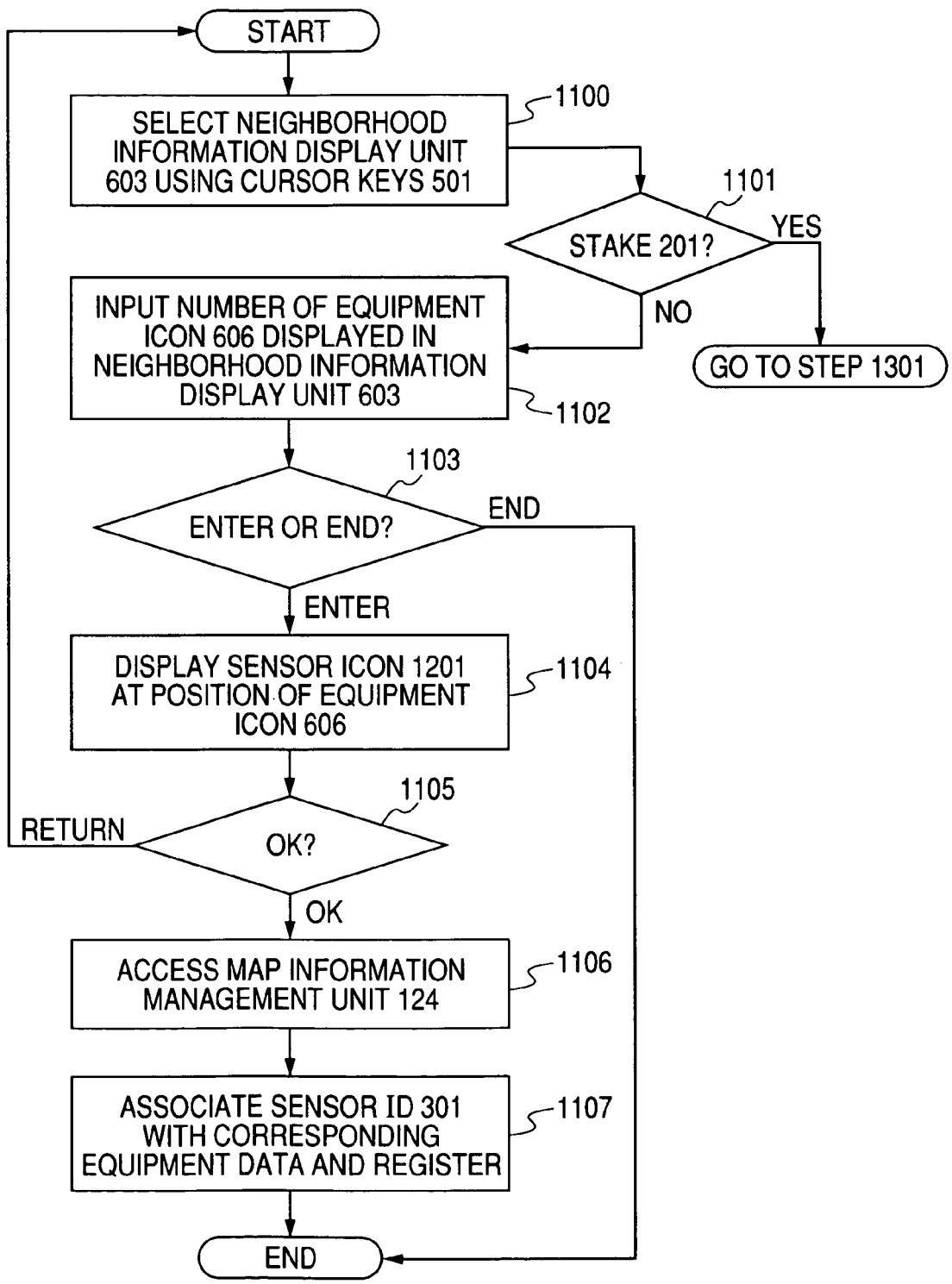
FIG. 11 shows an example of a processing flow for registering a sensor chip in the map DB.
Figure 12:
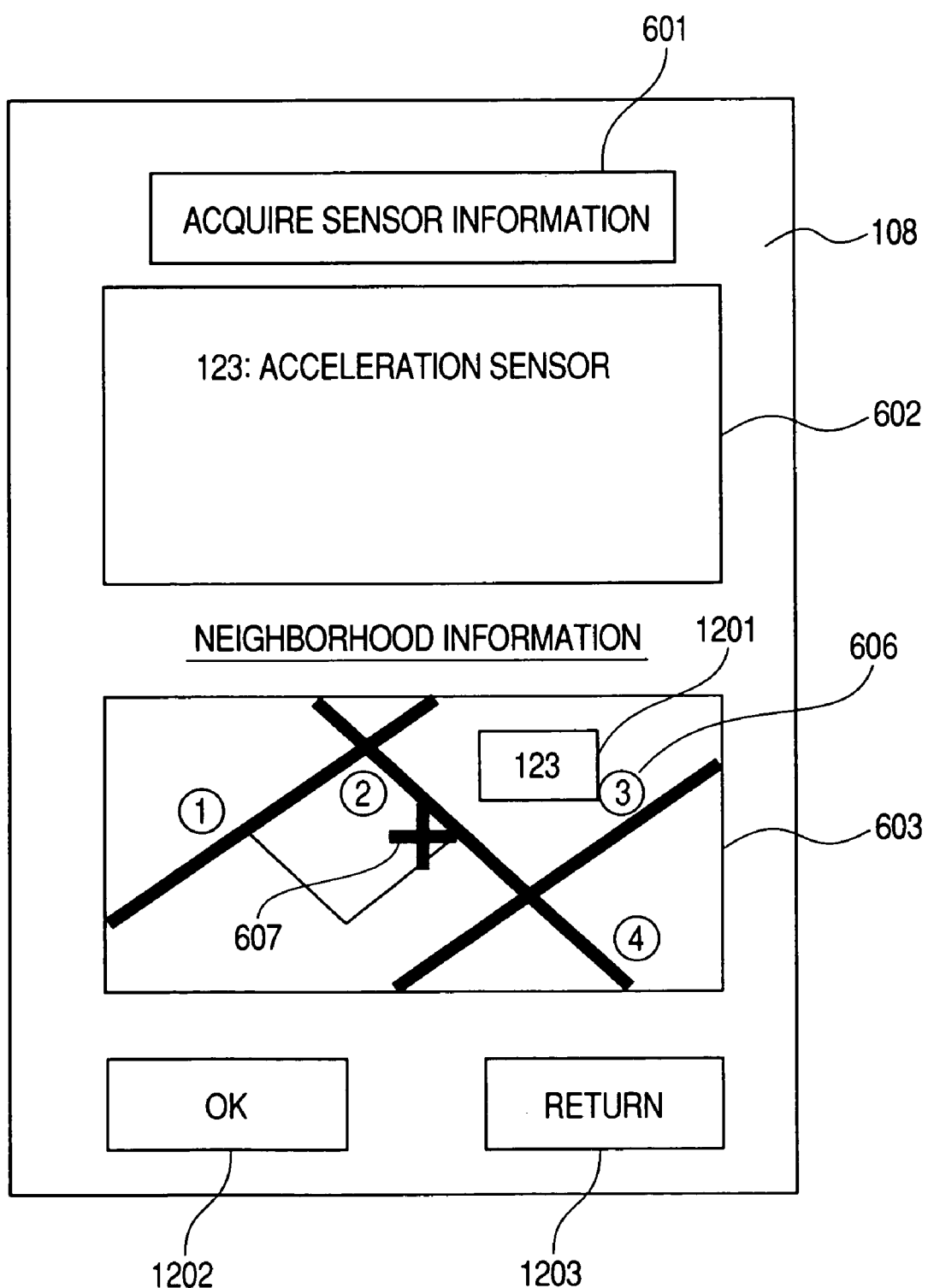
FIG. 12 is a diagram showing an example of a display screen for confirming an association between an equipment-icon and a sensor icon.

FIG. 11 shows a processing flow for associating the acquired sensor information with information about the equipment in which the sensor is installed. First in the processing flow, the neighborhood information display unit 603 is set to the selection region using the cursor keys 501 (step 1100). Whether or not the sensor chip 110 to be registered is of the stake 201 type is determined (step 1101). If the sensor chip 110 is not of the stake 201 type, the object ID 401 to be associated with one of the equipment icons 606 displayed in the neighborhood information display unit 603 is inputted (step 1102). If the sensor chip 110 to be registered is of the stake 201 type, processing skips to step 1301 being described later. In the present case, it is assumed that "3" is entered as the object ID 401 from the numeric keypad and that the select button 503 is then pressed to cause the equipment icon 606 for "3" entered as the object ID 401 to be highlighted, as shown in FIG. 10, on the display in the neighborhood information display unit 603. Next, whether or not the ENTER button 604 has been pressed is determined (step 1103). When the ENTER button 604 has been pressed, the sensor icon 1201 is displayed at the position of the selected equipment icon 606 (step 1104) and an input of confirmation is awaited (step 1105). FIG. 12 shows an example display screen which appears in step 1105 to wait for an input of confirmation. When, in this state, the OK button 1202 is pressed, the map information management unit 124 is accessed (step 1106) and the sensor ID 301 is associated with the sensor ID 404 column for the corresponding equipment data in the map DB 126 and registered (step 1107). If, in step 1105, the RETURN button 1203 is pressed, processing returns to step 1100.

Figure 13:
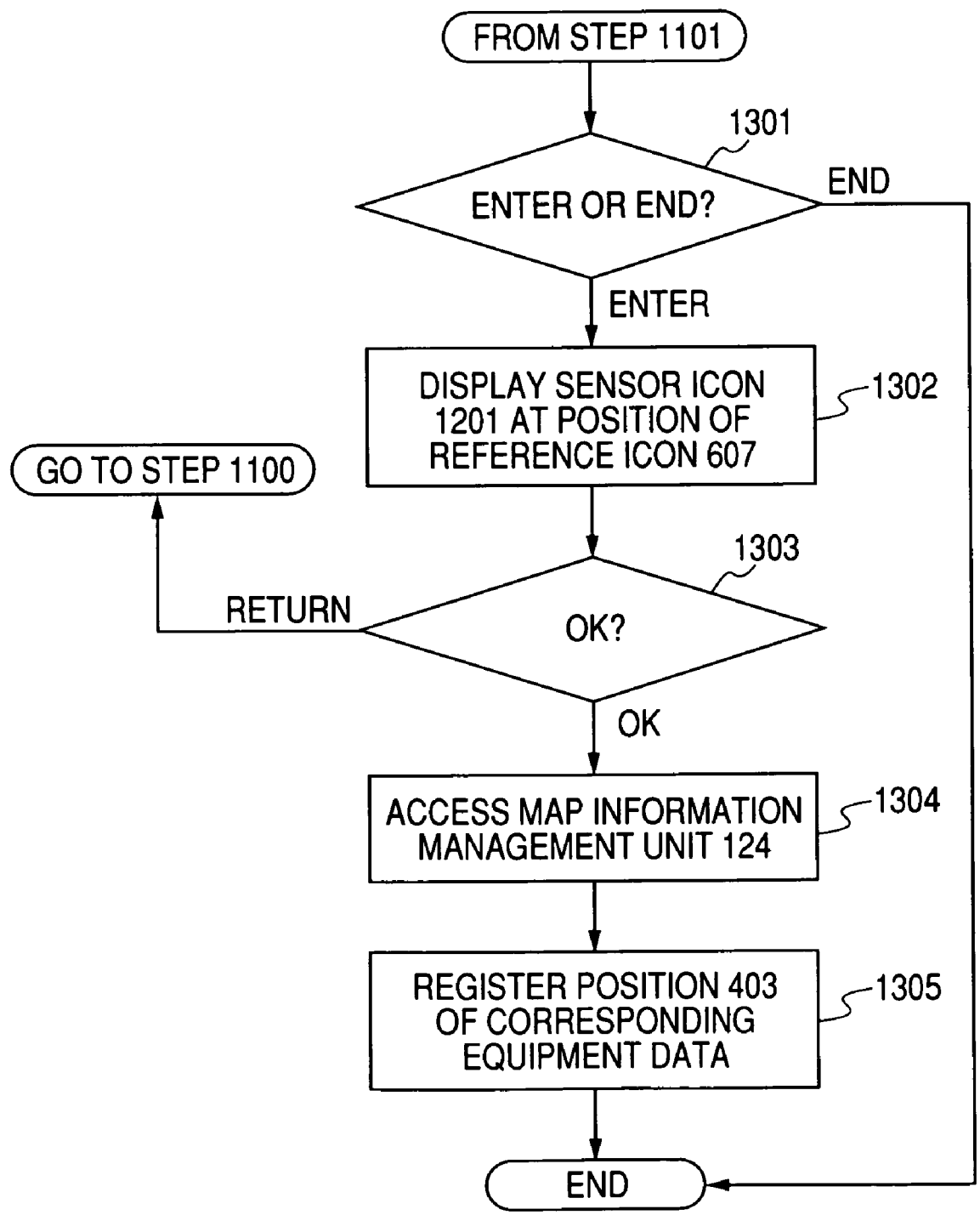
FIG. 13 shows an example of a processing flow for registering a location where a stake-shaped sensor is installed in the map DB.
Figure 14:
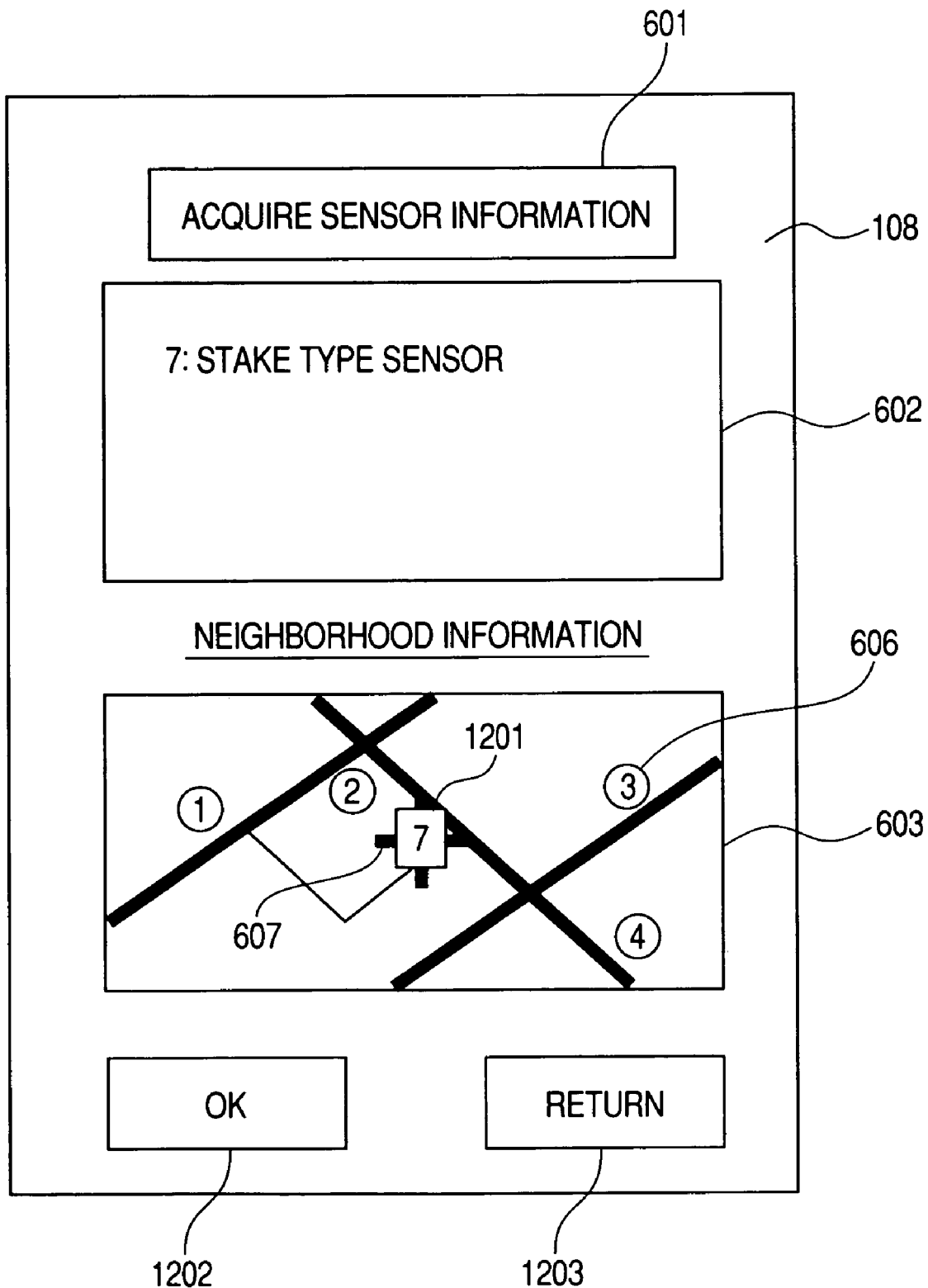
FIG. 14 is a diagram showing an example of a display screen showing a map for confirming a location where a stake-shaped sensor is installed.

FIG. 13 shows a processing flow performed when the exterior package of the sensor chip 110 is of the stake 201 type. After it is determined in step 1101 that the sensor chip 110 is of the stake 201 type, whether or not the ENTER button 604 has been pressed is determined (step 1301). When the ENTER button 604 has been pressed, the sensor icon 1201 is displayed at the position of the reference icon 607 (step 1302) and an input of confirmation is awaited (step 1303). FIG. 14 shows an example display which appears in step 1303 to wait for an input of confirmation. When, in this state, the OK button 1202 is pressed, the map information management unit 124 is accessed (step 1304) and the present position is registered in the position 403 column for the corresponding equipment data in the map DB 126 (step 1305). If, in step 1303, the RETURN button 1203 is selected, processing returns to step 1100.

Figure 15:
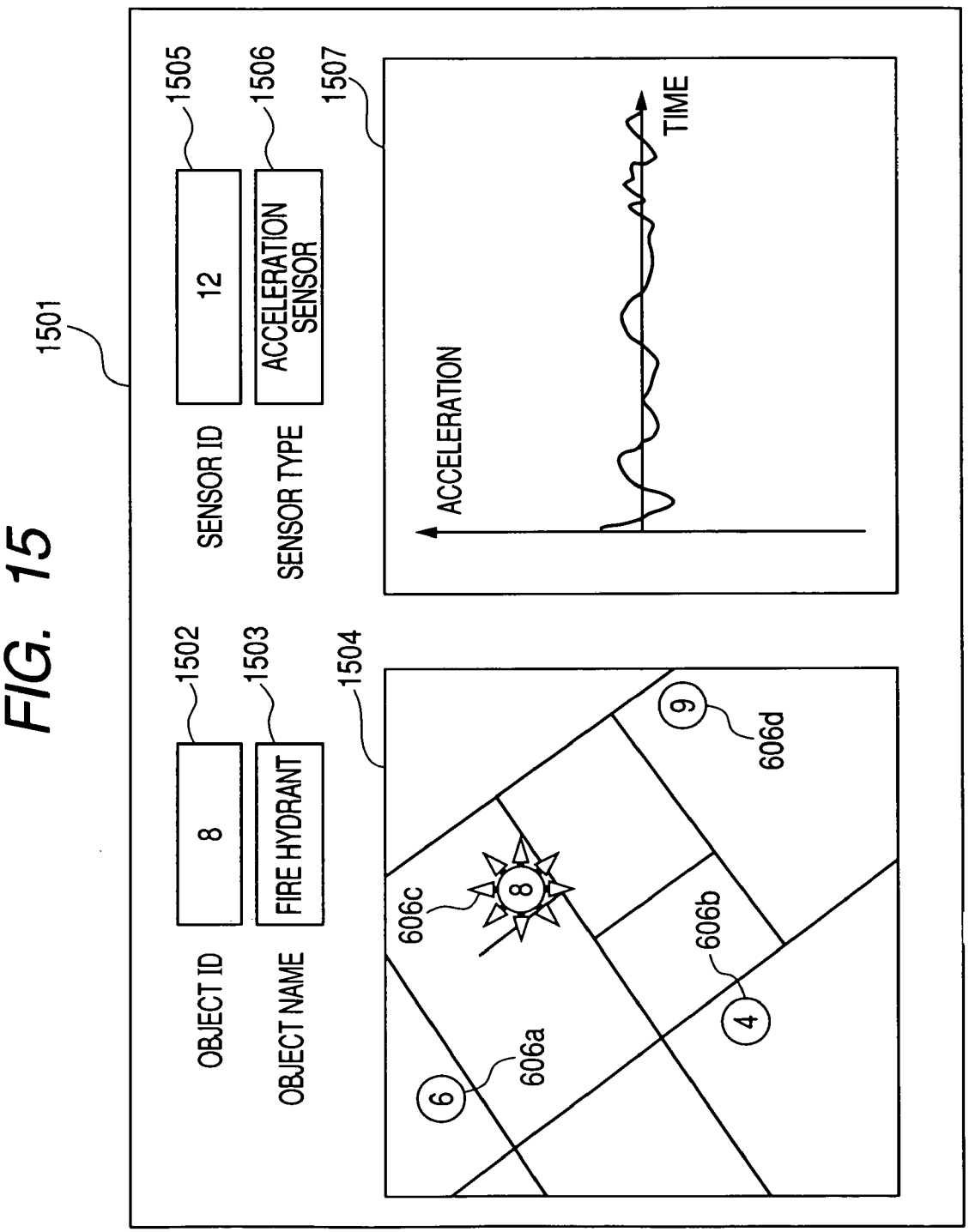
FIG. 15 is a diagram showing an example of a display screen for viewing microtremor measurements in the map information management unit.

Next, a method of viewing microtremors measured by the sensor chip 110 attached to equipment will be described with reference to FIGS. 15 and 16. FIG. 15 shows a display screen 1501 in the map information management unit 124. The display screen 1501 includes an object ID display unit 1502 for displaying the object ID 401 that is an equipment identifier, an object name display unit 1503 for displaying the object name 402 corresponding to the object ID 401, a map information display unit 1504 for displaying equipment on a map, a sensor ID display unit 1505 for displaying the sensor ID 301 corresponding to the sensor chip 110 attached to the equipment, a sensor type display unit 1506 for displaying the sensor type 302, and a graph display unit 1507 for graphically displaying a time-series DB 305.

Figure 16:
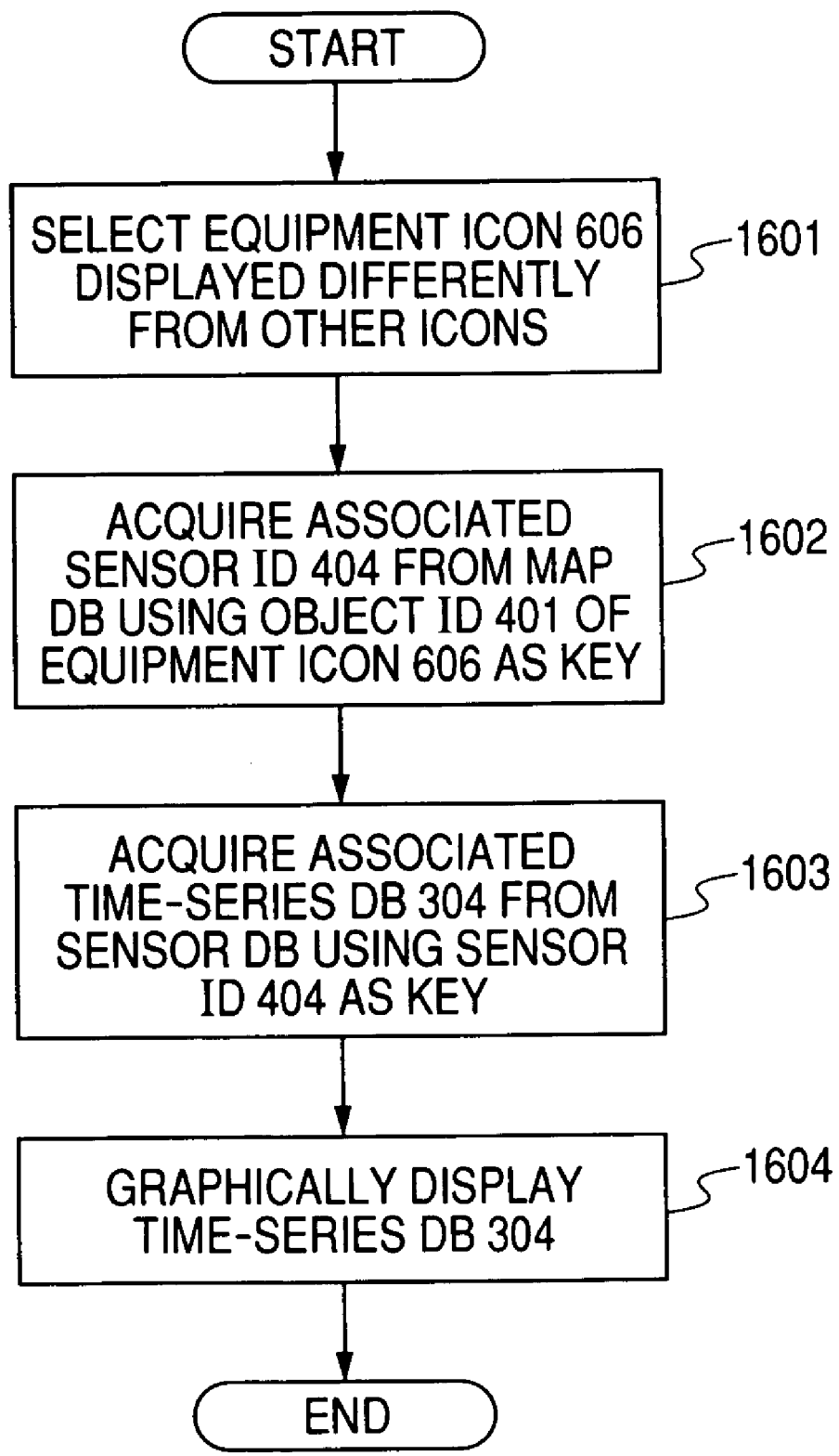
FIG. 16 shows an example of a processing flow for graphically displaying microtremor measurements.

FIG. 16 shows a flow of system processing performed making use of the display screen 1501. First in the processing flow, the equipment icon corresponding to the equipment at which measurement values are to be graphically displayed is selected from among the equipment icons 606 displayed in the map information display unit 1504 (step 1601). At this time, the equipment icon 606 corresponding to the equipment to which the sensor chip 110 is attached is displayed differently from other ones of the equipment icons 606. In FIG. 15 in which equipment icons 606a to 606d are shown, the equipment icon 606b of the object ID "4" to which the sensor chip 110 corresponds and the equipment icon 606c of the object ID "8" are displayed differently from the equipment icons 606a and 606d. In the present example, the display of the equipment icon 606c is flashing indicating that it is the currently selected equipment icon. The object ID display unit 1502 and the object name display unit 1503 display the object ID 401 and the object name 402 corresponding to the equipment icon 606c, and thereby the selection is shown. Next, the map DB 127 is searched using the object ID 401 corresponding to the equipment icon 606c as a key, and the associated sensor ID 404 is acquired (step 1602). Using the acquired sensor ID 404 as a key, an associated time-series DB 304 is acquired from the sensor DB 126 (step 1603). Based on the time-series DB 304 thus acquired, a time-series trend graph of measurement values is formed and displayed in the graph display unit 1507 (step 1604).

According to the present invention, a sensor chip attached to equipment can be easily associated with equipment information prepared as map information. It is also made possible to associate measurement data measured by a sensor with corresponding equipment and view the measurement data as map information.

INDUSTRIAL APPLICABILITY

As described above, the present information is useful for a system for managing, to cope with earthquakes, an environment or equipment using sensors installed in different locations. The present invention is particularly suitable for application to a system in which locations where sensors are installed are indicated on a map.

The invention claimed is:
1. A sensor network system comprising;
a sensor chip which can transmit measurement values by wireless communication;
a sensor database which stores the measurement values measured by the sensor chip;
a sensor information management unit which manages access to the sensor database;
a receiver which receives the measurement values from the sensor chip and accesses the sensor information management unit, via a network;
a map database which stores, as map information, data about equipment in which the sensor chip is installed;
a map information management unit which manages access to the map database; and
a sensor management device which registers a location where the sensor chip is installed in the map database,
wherein the sensor management device comprises:
a memory which stores a program and data;
a CPU which executes the program and controls operation;

an ID reading unit which reads identification information assigned to the sensor chip;

an own position measuring unit which acquires a present position of the sensor chip;

a wireless communication unit which can connect to the network by wireless communication;

a sensor information setting unit which inputs and outputs information about the sensor chip; and a display unit and an input unit both of which are controlled by the sensor information setting unit.

2. The sensor network system according to claim 1, wherein the sensor chip has a stake-shaped container which can be put in the ground as an exterior package.

3. The sensor network system according to claim 1, wherein the display unit includes:

a sensor information acquisition button, a sensor information display unit, a neighborhood information display unit which displays data about the equipment as neighborhood map information, a cross-shaped reference icon which appears in the neighborhood information display unit and which indicates a present position of the sensor chip, and an enter button which is used to register the sensor information and the equipment data in a state of being associated with each other.

4. The sensor network system according to claim 3, wherein the sensor management device comprises:

means for detecting pressing of the sensor information acquisition button, means for making the ID reading unit acquire the identification information having been encoded, means for decoding the sensor information based on the identification information acquired, and means for displaying the sensor information in the sensor information display unit.

5. The sensor network system according to claim 3, wherein the sensor management device comprises:

means for detecting pressing of the sensor information acquisition button, means for making the ID reading unit acquire the identification information, means for making the wireless communication unit access the sensor information management unit, means for transmitting the identification information, means for making the sensor information management unit acquire a sensor ID from the identification information, means for making the sensor information management unit search the sensor database using the sensor ID as a key and acquire corresponding sensor information, means for transmitting the sensor information to the sensor information setting unit, and means for displaying the sensor information in the sensor information display unit.

6. The sensor network system according to claim 5, wherein the sensor management device comprises:

means for displaying, when pressing of the enter button is detected with the neighborhood information display unit being selected and with an equipment icon displayed in the neighborhood information display unit being selected, a sensor icon at a position where the equipment icon is displayed, means for accessing the map information management unit upon confirming a combination of the equipment icon and the sensor icon, and means for associating the sensor ID with data being associated with the equipment icon, the data being included in the map database.

7. The sensor network system according to claim 6, wherein the display unit displays the equipment icon, when it is selected, differently from other equipment icons.

8. The sensor network system according to claim 6, wherein the sensor management device comprises:

means for displaying, when pressing of the enter button is detected with the neighborhood information display unit being selected, the sensor icon at a position of the reference icon, means for accessing the map information management unit upon confirming a position of the sensor icon, and means for associating the position with data associated with the sensor icon, the data being included in the map database.

9. The sensor network system according to claim 5, wherein the map information management unit detects selection of the equipment data, acquires the associated sensor ID from the map database, and acquires the measurement values associated with the sensor ID, the measurement values being accumulated in the sensor database.

* * * * *